United States Patent
Perrine et al.

(10) Patent No.: US 11,853,249 B2
(45) Date of Patent: Dec. 26, 2023

(54) PHYSICAL INTERFACE MODULE

(71) Applicant: Nagravision S.A., Cheseaux-sur-Lausanne (CH)

(72) Inventors: Jérôme Perrine, Romanel sur Morges (CH); Hervé Goupil, Villars sous Yens (CH); Maurice Van Riek, Belmont (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 470 days.

(21) Appl. No.: 14/729,196

(22) Filed: Jun. 3, 2015

(65) Prior Publication Data

US 2015/0370751 A1 Dec. 24, 2015

(30) Foreign Application Priority Data

Jun. 20, 2014 (EP) .................................... 14173326

(51) Int. Cl.
*G06F 13/42* (2006.01)
*G06F 13/38* (2006.01)
*G06F 13/40* (2006.01)

(52) U.S. Cl.
CPC ........ *G06F 13/4252* (2013.01); *G06F 13/385* (2013.01); *G06F 13/4068* (2013.01)

(58) Field of Classification Search
CPC . G06F 13/4252; G06F 13/385; G06F 13/4068
See application file for complete search history.

(56) References Cited

U.S. PATENT DOCUMENTS

| | | | |
|---|---|---|---|
| 6,334,160 B1 | 12/2001 | Emmert et al. | |
| 7,058,075 B1 * | 6/2006 | Wong | H04L 69/18 370/466 |

(Continued)

FOREIGN PATENT DOCUMENTS

| | | |
|---|---|---|
| EP | 2407916 A1 | 1/2012 |
| GB | 2351576 A | 1/2001 |

(Continued)

OTHER PUBLICATIONS

Digital Serial Interface < https://en.wikipedia.org/wiki/Digital_Serial_Interface >, accessed May 6, 2017.*

(Continued)

*Primary Examiner* — Farley Abad
(74) *Attorney, Agent, or Firm* — POLSINELLI LLP

(57) ABSTRACT

An embodiment of the present invention relates to physical interfaces, especially those used on consumer electronics devices. A processor, in which an embodiment of the disclosed invention is deployed, includes a physical interface for connecting to and communicating with a peripheral device, the peripheral device being configured to operate according to a standard communications protocol or to a different protocol which is adapted to have a more bandwidth-efficient performance. The processor detects which of the two protocols the attached peripheral device uses and configures the physical interface to operate according to the detected protocol. An embodiment of the invention allows for new, bandwidth-efficient communications protocols to be executed across existing standardized physical interface hardware, thereby allowing for easier acceptance of the new protocols within the consumer electronics industry. Bandwidth-efficient communications protocols advantageously allow for more convenient transfer of media content or for big-data applications to be more conveniently handled.

11 Claims, 1 Drawing Sheet

(56) References Cited

U.S. PATENT DOCUMENTS

| | | | | |
|---|---|---|---|---|
| 7,159,052 | B1* | 1/2007 | Rhee | G06F 13/4072 |
| | | | | 710/63 |
| 7,440,287 | B1* | 10/2008 | Ni | H01R 27/00 |
| | | | | 174/50.51 |
| 7,737,747 | B2* | 6/2010 | Kamath | H03K 19/0005 |
| | | | | 327/170 |
| 8,494,585 | B2* | 7/2013 | Chapman | H04M 1/0254 |
| | | | | 455/550.1 |
| 8,848,726 | B1* | 9/2014 | Palmer | H04L 45/745 |
| | | | | 370/466 |
| 2004/0254014 | A1* | 12/2004 | Quraishi | G07F 17/32 |
| | | | | 463/29 |
| 2005/0099833 | A1* | 5/2005 | Perroni | G06F 13/4243 |
| | | | | 365/63 |
| 2006/0229048 | A1* | 10/2006 | Carroll | H01Q 1/246 |
| | | | | 455/268 |
| 2008/0013569 | A1* | 1/2008 | Boren | H04L 12/66 |
| | | | | 370/466 |
| 2010/0174835 | A1 | 7/2010 | Chung | |
| 2010/0312934 | A1* | 12/2010 | Chi | G06F 13/385 |
| | | | | 710/110 |
| 2012/0265911 | A1* | 10/2012 | Connolly | G06F 13/387 |
| | | | | 710/300 |
| 2012/0311371 | A1* | 12/2012 | Shaeffer | G06F 13/287 |
| | | | | 713/501 |
| 2012/0329333 | A1* | 12/2012 | Ho | H01R 12/7082 |
| | | | | 439/660 |
| 2013/0185462 | A1 | 7/2013 | Manabe | |
| 2014/0075067 | A1* | 3/2014 | Mullins | H04M 1/0274 |
| | | | | 710/105 |
| 2015/0022262 | A1* | 1/2015 | Du | H01L 23/481 |
| | | | | 327/565 |

FOREIGN PATENT DOCUMENTS

| | | |
|---|---|---|
| WO | WO-0210901 A2 | 2/2002 |
| WO | WO-2012119296 A1 | 9/2012 |

OTHER PUBLICATIONS

Logic level, < https://en.wikipedia.org/wiki/Logic_level >, accessed May 6, 2017.*

List of Device Bit Rates, < https://en.wikipedia.org/wiki/List_of_device_bit_rates#Computer_buses>, accessed May 6, 2017.*

* cited by examiner

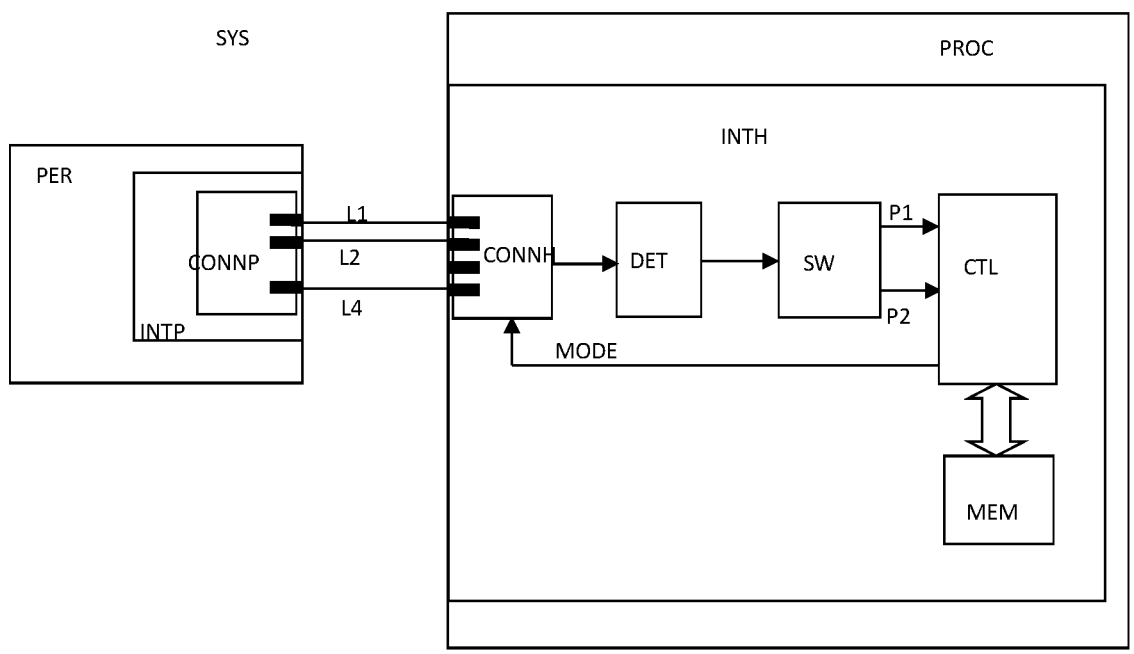

PHYSICAL INTERFACE MODULE

PRIORITY STATEMENT

The present application hereby claims priority under 35 U.S.C. § 119 to European patent application number EP 14173326.1 filed Jun. 20, 2014, the entire contents of which are hereby incorporated herein by reference.

FIELD

The present disclosure relates generally to the domain of consumer electronics and more particularly to peripheral interfaces or communications interfaces for digital media consumer electronics devices, such peripheral or communications interfaces generally comprising a physical "layer" and a protocol "layer". At least one embodiment of the invention provides particular advantage in the domain of multi-chip systems wherein a proprietary chip is to be interfaced, in a particular non-standard manner, with a chip having a standard interface.

BACKGROUND

Many consumer electronics (CE) devices comprise a standard communications interface such as a USB interface, Ethernet interface or HDMI interface, among others. These may also be called peripheral interfaces since they are sometimes intended to allow communication between the consumer device and a peripheral device. The term physical interface is sometimes used when referring to the hardware associated with a peripheral interface or all or part of the visible hardware components of the peripheral interface, such as the connection pads. A physical interface is sometimes taken to be synonymous for an electrical connector i.e. an electro-mechanical device for joining electrical circuits. The term "physical layer" is sometimes used to describe this physical aspect of the interface. An interface module includes the physical layer and the protocol layer.

Such standard interfaces, by nature of them being standardized i.e. having to accommodate many different types of protocols which existed before the existence of whatever standard they endeavor to fulfill, usually end up functioning according to a standardized protocol which is less than optimal. In order to be flexible enough to be accepted by users of the previously existing protocols, the standardized protocol generally includes many overheads, which may eventually render the standard unsuitable where very high performance is required.

For example, existing USB, Ethernet or HDMI Standards are not always suitable for point-to-point high speed communication due to protocol overheads. Particularly, in the domain of media content protection, content and "Big Data" protection based on external secure token exchange there is a need for high performance communication interfaces with low protocol overhead simply to get the necessary bandwidth to get the throughput required to deal with such large quantities of data which have to be transferred. The term "Big Data" is generally accepted in the industry as meaning data or data sets with sizes beyond the ability of commonly used software tools to capture, curate, manage, and process within an elapsed time which is tolerable given the goal to be achieved by said capturing, curating, managing and processing.

European Patent Application Publication number 2,407,916 A1 discloses a way to be able to make use of existing pins of a device's physical interface in a versatile manner whereby the same pads of the device's physical interface can be automatically reconfigured to operate according to one or another communications protocol based on a level of voltage detected on the power supply pin of the interface. This allows for a device having the physical interface of the described invention to be able to simply and conveniently adapt its interface to be able to provide for a larger throughput whenever necessary.

There remains a problem in the state of the art whereby a first chip manufacturer, who owns a proprietary communications interface, including such interface's physical layer and protocol layer, allows for a particularly advantageous proprietary function, owned by said first chip manufacturer, to be realized in an optimized manner. For example, the first chip manufacturer has a particular proprietary streaming processing function which involves decryption of a received video stream, including certain secure processing functions. The streaming processing function requires a very large throughput which cannot be handled by any known standard interface and which may even require more pins than are available on a particular standard interface. The video stream is to be received from a chip owned by a second chip manufacturer (i.e. a third party chip) (or an otherwise external System on a Chip (SOC) circuit) and so a combination of two chips is required for the first chip manufacturer to be able to provide a complete function to a potential client, one chip which he owns and another chip which he does not own.

The second chip manufacturer also intends for his chip to be sold to many different chip manufacturers and not just the first chip manufacturer. As such, the second chip manufacturer makes the video stream available via a standard interface such as USB 3.0 or HDMI or the like. The second chip manufacturer has no incentive to adapt his standard interface to optimize it for use with the first chip manufacturer's chip since that would make it more difficult for the second chip manufacturer to sell his chip to chip manufacturers other than the first chip manufacturer. The first chip manufacturer however require that the second chip manufacturer's interface be able to operate according to his (the first chip manufacturer's) improved protocol so that a combination of the two chips, when offered for sale on the market will provide significant advantages over a similar combination offered by a competitor who does not own the advantageous protocol owned by the first chip manufacturer, thereby allowing the first chip manufacturer to gain market share.

One solution would be for the second chip manufacturer to add a supplementary interface on his chip solely for use by the first chip manufacturer. However, consumer electronics device manufacturers are usually reluctant to add new communications interfaces over and above the existing standard ones mentioned above due to the extra costs involved and the long lead time required to complete new standardizing efforts. For this reason there remains a problem in providing content protection or Big Data protection when high-speed point-to-point communication is required in consumer electronic devices such as set-top boxes, "Connected TVs", tablet computers, smart-phones, DVD players, game consoles, etc. . . . .

SUMMARY

There is disclosed a means of adapting the physical and protocol layers to allow for a convenient realization of a proprietary communications interface using a standard physical interface and especially where the digital media is subject to security protection procedures.

At least one embodiment of the present invention relates to physical interfaces, especially those used on consumer electronics devices. A module in which an embodiment of the disclosed invention is deployed comprises a physical interface for connecting to and communicating with a peripheral module, the peripheral module being configured to operate according to a proprietary protocol which is preferably adapted to have a more bandwidth-efficient performance than a known standard protocol. The module comprises means for detecting which of the two protocols the attached peripheral device uses and means to configure the physical interface to operate according to the detected protocol. Consumer electronics manufacturers are reluctant to add new communications interfaces to their equipment due to the extra cost involved and due to the sometimes very long lead times involved in going through the standardization qualifying processes. The invention therefore allows for new, bandwidth-efficient communications protocols to be executed across existing standardized physical interface hardware, thereby allowing for easier acceptance of the new protocols within the consumer electronics industry. Bandwidth-efficient communications protocols advantageously allow for more convenient transfer of media content or for big-data applications to be more conveniently handled.

According to a first aspect of at least one embodiment of the present invention, there is disclosed a system-on-chip SoC, comprising a processor configured to communicate with a peripheral device through a first physical interface module associated with the processor and through a second physical interface module associated with the peripheral device.

A method for managing communication between the processor and the peripheral device of a system-on-chip is also disclosed.

A further advantage provided by at least one embodiment of the present invention is that by not including a special interface on the SoC, competitors need not be aware that the same SoC chip that they are using in a standard fashion may actually be capable of realizing a particularly advantageous proprietary protocol instead.

BRIEF DESCRIPTION OF THE DRAWINGS

The present invention will be better understood thanks to the detailed description which follows and the accompanying drawings, which are given as non-limiting examples of embodiments of the invention, namely:

The FIGURE, showing a system in which an embodiment of the present invention may be deployed.

DETAILED DESCRIPTION

Embodiments of the present invention make use of connections of conventional standard physical interfaces such as USB, Ethernet, HDMI, eSATA and the like. These interfaces, as well as some other proprietary interfaces which have not been specifically mentioned, operate according to protocols which can adversely affect bandwidth for "Big Data" applications, as discussed above. Aspects of the present invention are aimed at providing a new interface comprising all or some of the standard interface connections (the physical interface), the new interface configured to enhance communication speed and efficiency. According to some embodiments, the new interface does not make use of the standard interface's protocol stack but merely takes advantage of the existing footprint of the standard interface connections and, more generally, of the fact that many consumer electronics devices have such existing physical interfaces. By protocol it is meant a suite of one or more functions which are executed by a module to allow it to operate according to a given standard, the standard being a generally accepted industry standard or a newly proposed standard.

In the context of the present invention, USB includes USB 2.0, USB 3.0, mini-USB and micro-USB.

According to embodiments of the present invention, a simplified protocol layer is provided to replace the legacy protocols which are used in conventional standard interfaces (USB, Ethernet, HDMI, . . . ), the simplified protocol layer being implemented on all or some of the connections of the existing standard interface. In this manner all or part of the low-level physical interface of an existing communication interface can be exploited to use the proposed simplified protocol layer. Whether or not the simplified protocol is used is determined by a detection means, using tokens of different types, introduced through the communication interface. If a legacy type of token is detected by a device in which the embodiment of the invention is deployed, then the device will expect the interface to operate according to the legacy protocol and it therefore will configure itself, and possibly the interface, to operate according to the legacy protocol. If, on the other hand, a new type of token is detected, then the device and the interface operate according to the simplified protocol.

By operation according to one or other of the protocols it is meant execution of functions or routines which allows a module's communications interface to function in compliance with one or other standard. Operating according to one or other protocol may involve interpreting a set of one or more connection pins of the communications interface differently or routing one or more of the interface signals differently, towards different blocks or different pins of the same block for example. One or more connection pins or signals may be ignored in one protocol whereas it may serve a purpose in another protocol. Different voltage levels on the same pins or signals may be expected in one protocol versus another. Different software routines may be executed between one protocol and another.

According to one embodiment, the default mode of operation could be for the communications interface to operate according to the legacy protocol, the host device therefore being configured to implement the legacy protocol. In this case, the host may be triggered to operate according to a new protocol (simplified for example), thereby configuring the communications interface to operate according to the new protocol. Conversely, the default mode of operation could be for the communications interface to operate according to the new protocol, wherein the host device may be triggered into operating according to the legacy protocol.

The correct protocol to operate may be triggered by the type of token which is detected on the interface. According to different embodiments of the present invention, the detection mechanism may be based on voltage detection, current detection, current supply pattern, impedance detection, frequency detection or detection of a logical state or even detection of a result of a self-test or a timer state (e.g. time-out) for example.

According to one embodiment, a decision as to which protocol a device will operate may be decided on one hand once upon power-up of the device or once the device is able to detect a peripheral connected to the interface. On the other hand, the decision may be taken while the device is powered on. In this case it is generally when a peripheral is first connected to the interface while the device is operating or when a change of peripherals is made while the device is operating.

The FIGURE shows a system in which an embodiment of the present invention may be deployed. The system comprises a first chip and a second chip. The first chip is configured to operate according to a proprietary communications protocol which is particularly advantageous in some respect, for example in terms of efficient use of bandwidth, thereby rendering possible an exchange of and fast processing of particularly large files of digital audio-video content. (For example, 400 MB full I/O duplex may be considered to provide for advantageous operation in this respect). Consequently, the first chip comprises a proprietary communications interface which is particularly suited to the proprietary communications protocol i.e. it is configured to operate according to the proprietary protocol. The second chip comprises a standard communications interface such as a USB 2, USB 3, HDMI or Ethernet interface for example, with a standard number of pins (i.e. a number of pins compatible with the standard it is intended to operate). According to the embodiment, the second chip is further configured to detect when a peripheral is connected to its communications interface and, in the case where it detects that the peripheral is capable of operating according to the proprietary protocol, to reconfigure its interface pads to be compatible with the proprietary protocol and to cause the hardware and software of its communications interface to operate according to the proprietary protocol.

It is to be noted that instead of having two chips as described above, a system within which the embodiment of the present invention is deployed may instead present itself as a so called "SoC" or "System on Chip", wherein the described first chip is a first module and the described second chip is a second module, with both modules being integrated onto one integrated circuit as part of the inventive solution. Usually the first module would be a module which is proprietary to a first (silicon) solution vendor for example, while the second module would be a module which is proprietary to a second (silicon) solution vendor, preferably a standard module which could be used by a plurality of different third party silicon solution vendors or by customers who integrate such modules on a chip in order to realize a particular function.

According to an aspect of an embodiment of the invention, a first module, say a video stream processing module which includes a secure decryption function, comprises a block configured to perform a proprietary protocol for the transfer of video content to and/or from a second module. The proprietary function may allow for the achievement of a transfer rate of 400 MB I/O full-duplex data between the two modules for example. According to another aspect, a second module comprises a standard interface block, such as a USB 3 interface block. Being a standard interface block, it is configured to be able to detect what type of device is connected to it. As is known in the art, such detection means include detecting what data rate the connected device is capable handling, detecting whether it can perform full duplex or half duplex, detecting the type of interface the connected device is using (e.g. USB 2 or USB 3 etc). According to the embodiment, the second module is further configured to operate according to the proprietary protocol by re-assigning one or more of its existing pins to operate according to the proprietary protocol. In other words it is adapted to be able to reconfigure its pins according to the proprietary protocol i.e. to reconfigure the physical layer. It is further configured to be able to operate, on a software level, according to the proprietary protocol i.e. to reconfigure its protocol layer. In order to be able to reconfigure the interface and thereby to implement the proprietary protocol, the second module is further configured to perform a new detection routine before the standard detection routine described above, and if necessary instead of the standard detection routine, thereby allowing the second module to reconfigure itself to operate according to the proprietary protocol.

According to one embodiment, the detection protocol comprises sending a command from the second module to a module connected to the interface, waiting for a response, switching the interface to operate according to the standard protocol or according to the proprietary protocol depending on the response.

According to another embodiment, instead of having a protocol-defined detection process, the detection process could hardware and/or software to detect whether a device connected to the interface is configured to operate according to a standard protocol or to the proprietary protocol based at least upon a predetermined characterizing feature which is characteristic of the proprietary protocol.

The proprietary protocol may use any number of pins from the interface of the second module up to a maximum of the total number of pins available according to the standard protocol it is adapted to perform. Consequently, the second module is configured to reassign the functions of any number of its interface pins according to the requirements of the proprietary protocol. Furthermore, the second module is adapted to perform protocol steps according to the proprietary protocol when it detects that a module compatible with the proprietary protocol is connected to the interface instead of performing the standard steps that it would normally perform when a module is detected which uses the standard interface.

According to an embodiment of another aspect of the present invention, there is provided a system comprising a first module and a second module, the first module being associated with the second module via interfaces through which they are connected. The interface on the first module is configured to operate according to a proprietary protocol and the interface of the second module is configured to be able to operate according to a standard protocol. The second module is further configured to be able to re-assign the pins of its interface according to the proprietary protocol when it detects that it is connected to a module which communicates according to the proprietary protocol. The second module is further configured to perform operations according to the proprietary protocol when it detects that it is connected to a module which communicates according to the proprietary protocol.

According to different embodiments of the present invention, detection of the capabilities of the first module by the second module may be performed based on parameters, associated with one or more pins of the interface, comprising electrical properties or properties associated with software protocol. In the case where a system in which an embodiment of the present invention is deployed is an integrated circuit comprising a module having a standard physical interface adapted according to an embodiment of the invention and a module adapted to perform the proprietary protocol of the invention, the detection may be performed at power on. If the system in which an embodiment of the invention is deployed comprises discreet modules which can be plugged into each other, then the detection could be re-performed any time certain modules are plugged or unplugged with each other. Detection means may include detection of the way in which a device or module is powered up e.g. slow-rising power supply, fast-rising power supply, power-on while a certain pin is (or certain pins) are held low or held high (or a combination of pins configured according to a pre-determined pattern). Alternatively, a self-test sequence could be used, where particular pre-determined patterns are detected. According to other embodiments a particular pattern of bits may be received from a peripheral device, which the module having the standard-compatible interface interprets as being a trigger for configuring the interface to operate according to one or other protocol.

The FIGURE shows a system in which an embodiment of the present invention may be deployed. In the FIGURE, the second module, in which an embodiment of the present invention may be deployed, is called a processor (PROC). The processor (PROC) comprises a communications interface module (INTH) i.e. a physical interface module. The interface module (INTH) has a connector (CONNH), which is shown in the example of the FIGURE as having a set of four pins although it may have a number of pins as required by any standard communications protocol. The physical interface module (INTH) may also have a controller (CTL) to manage the operation of the interface module according to a communications protocol, the controller being further configured to manage the operation of the interface module according to a proprietary communications protocol different from the standard protocol. It may further comprise a memory for storing instructions or values useful to the controller.

The physical interface module (INTH) is configured to operate according to at least one of the standard protocols (P2). It is further configured to be able to operate according to at least one other (alternative) communications protocol (P1) the proprietary protocol. Preferably the proprietary communications protocol (P1) should have a more efficient bandwidth performance than the standard protocol (P2).

In the FIGURE, the proprietary module is called a peripheral device (PER). The physical interface module (INTH) is still further configured to selectively switch to operate either of the two protocols (P1, P2). To do this, the physical interface module (INTH) comprises a detector (DET) in order to control the switch between the two protocols (P1, P2). Any detector (DET) which can detect to which protocol (P1, P2) a peripheral device (PER) connected to a communications bus linking the processor (PROC) and the peripheral device is configured to operate will do. For example, as shown in the FIGURE, the peripheral device (PER) is configured to operate according to a more bandwidth-efficient protocol (P1) and comprises a communications interface (INTP) with a connector (CONNP) having three pins. In this case the detector (detection means) (DET) on the processor (PROC) may be configured to detect when one of the pins of the connector (CONNH) of its interface module (INTH) is not being used. This may be done using an open circuit detector or a short circuit detector as detecting means, for example. When the detector (DET) detects that only three pins are being used it can then program or otherwise configure the interface module to operate according to the bandwidth-efficient protocol (P1). Conversely, if the peripheral device had four pins on its interface module, configured to operate according to the standard protocol, then the detector (DET) detects that the peripheral uses all of the contacts of the interface (INTH) and the interface (INTH) is re-configured to operate according to the standard protocol (P2). The detector (DET) can take any of the forms described above for example, as long as it allows the interface module (INTH) to know to which type of peripheral it is connected.

According to an embodiment the physical interface module comprises a controller configured to manage the operation of the interface according to either a standard communication protocol or to an alternative communication protocol (the proprietary communication protocol), the alternative communication protocol allowing for a more efficient throughput of data across the communications bus and thereby being more suitable for "big-data" applications. The interface module may also comprise a memory to store commands or variables or other values for the controller.

An example of an interface module according to an embodiment of the present invention, in which the detection means uses electrical detection, could be an interface module comprising current measuring means i.e. an ammeter. In this example the operating current of the peripheral device is measured using the detection means (i.e. the ammeter). The output of the ammeter is used to trigger the interface into operating according to one or other protocol. In this case it is known that peripheral devices which operate according to the legacy (standard) protocol have a current consumption which is below a predetermined threshold whereas peripheral devices which operate according to a new, more bandwidth efficient protocol with less overheads have a current consumption which is well above the predetermined threshold. By including a current measurement module to measure the current on the power supply pin of the communications interface and a comparator to detect whether the peripheral power supply current is higher or lower than the predetermined threshold, the interface module (and therefore the supposedly standard module) can determine whether the peripheral device (the proprietary module) should operate according to the legacy (standard) protocol or the new (proprietary) protocol and thereby configure itself (including the interface) to operate according to the detected protocol. The interface comprises detection means to detect when the communications interface is to be operated according to the legacy protocol or the new protocol and multiplexing means to allow the interface pins to be reconfigured according to the detected protocol, thereby bypassing one protocol in favor of the other.

Simplifying of the new protocol with respect to the standard (or legacy) protocol may involve improving bandwidth usage, using simpler chip design or just using an existing protocol which is known to provide more bandwidth efficiency with respect to a legacy protocol.

The invention claimed is:

1. A system-on-chip, comprising:
a communications module that includes at least a processor, the communications module being configured to selectively communicate with a peripheral module of an external device using at least one of a first communications protocol or a second communications protocol, the first communications protocol being a standard protocol and the second communications protocol being a non-standard protocol, wherein the non-standard protocol is a proprietary protocol for a solution vendor;
a physical layer having a plurality of electrical connections configured to connect the communications module and the peripheral module of the external device, the physical layer using a same plurality of electrical connections to selectively operate according to the first communications protocol or the second communications protocol, wherein the second communications protocol is different from the first communications protocol and the second communications protocol provides faster communication in a communication bus linking the processor of the communications module and the peripheral module than the first communications protocol;

the processor configured to:
  select between the first communications protocol and the second communications protocol based at least on a protocol selection signal; and
  cause the communications module to reconfigure one or more of the plurality of electrical connections of the physical layer to communicate with the peripheral module of the external device through the physical layer using the selected first communications protocol or second communications protocol; and a detector configured to monitor, based on a connection of the peripheral module of the external device to the physical layer, the plurality of electrical connections to detect one or more use cases of the plurality of electrical connections and to provide the protocol selection signal based on at least one predetermined parameter associated with detecting the one or more use cases involving the plurality of electrical connections.

2. The system-on-chip according to claim 1, wherein the first communications protocol is Universal Serial Bus (USB) 2, USB 3, Ethernet, High-Definition Multimedia Interface (HDMI), or external Serial Advanced Technology Attachment (eSATA).

3. The system-on-chip according to claim 1, wherein the detector is configured to determine the at least one predetermined parameter by measuring an electrical characteristic of at least one of the plurality of electrical connections and to provide the protocol selection signal based on the measured electrical characteristic.

4. The system-on-chip according to claim 3, wherein the electrical characteristic includes at least one of current, voltage, impedance, frequency, or logical level, the protocol selection signal being based on a comparison of the measured electrical characteristic with a reference electrical characteristic including at least one of threshold current, threshold voltage, threshold impedance, reference frequency, or reference logical level, respectively.

5. The system-on-chip according to claim 3, wherein the detector is an open circuit detector configured to detect at least one from the plurality of electrical connections as being open-circuited, the protocol selection signal depending on whether or not an open circuit is detected.

6. The system-on-chip according to claim 3, wherein the detector comprises a register for receiving a sequence of one or more bits via the one or more of the plurality of electrical connections of the physical layer, the protocol selection signal being based on a match between a predetermined sequence of one or more bits and the received sequence of one or more bits.

7. A method for managing communication in a system-on-chip, the method comprising:

monitoring a plurality of electrical connections in a physical layer that connects a communications module of the system-on-chip with a peripheral module of an external device to detect one or more use cases of the plurality of electrical connections;

providing a protocol selection signal based on at least one predetermined parameter associated with detecting the one or more use cases involving the plurality of electrical connections;

selecting, based on the protocol selection signal, a protocol for operation of the physical layer using a same plurality of electrical connections, the protocol including one of a first communications protocol or a second communications protocol, wherein the second communications protocol is different from the first communications protocol, and the second communications protocol is arranged to provide faster communication with the peripheral module over a communication bus than the first communications protocol, the first communications protocol being a standard protocol and the second communications protocol being a non-standard protocol, wherein the non-standard protocol is a proprietary protocol for a solution vendor; and reconfiguring at least one of the plurality of electrical connections of the physical layer to communicate with the peripheral module of the external device through the physical layer using the second communications protocol when the second communications protocol is selected.

8. The method according to claim 7, wherein the first communications protocol is Universal Serial Bus (USB) 2, USB 3, Ethernet, High-Definition Multimedia Interface (HDMI), or external Serial Advanced Technology Attachment (eSATA).

9. The method according to claim 7, further comprising determining the at least one predetermined parameter by measuring an electrical characteristic on at least one of the plurality of electrical connections, the measured electrical characteristic including at least one of current, voltage, impedance, frequency, or logical level, the protocol selection signal being based on a comparison of the measured electrical characteristic with a reference electrical characteristic including at least one of threshold current, threshold voltage, threshold impedance, reference frequency, or reference logical level, respectively.

10. The method according to claim 7, further comprising detecting at least one from the plurality of electrical connections as being open-circuited, the protocol selection signal depending on whether or not an open circuit is detected.

11. The method according to claim 7, further comprising receiving a sequence of one or more bits via one or more of the plurality of electrical connections of the physical layer, the protocol selection signal being based on a match between a predetermined sequence of one or more bits and the received sequence of one or more bits.

* * * * *